United States Patent [19]

Brouwer et al.

[11] Patent Number: 5,657,462
[45] Date of Patent: Aug. 12, 1997

[54] METHOD AND APPARATUS FOR DISPLAYING ANIMATED CHARACTERS UPON A COMPUTER SCREEN IN WHICH A COMPOSITE VIDEO DISPLAY IS MERGED INTO A STATIC BACKGROUND SUCH THAT THE BORDER BETWEEN THE BACKGROUND AND THE VIDEO IS INDISCERNIBLE

[75] Inventors: James R. Brouwer, Cincinnati; Mitchell Scott Miller, West Chester; Stephen Elwood Simula, Cincinnati, all of Ohio

[73] Assignee: CollegeView Partnership, Cincinnati, Ohio

[21] Appl. No.: 594,404

[22] Filed: Jan. 31, 1996

Related U.S. Application Data

[63] Continuation of Ser. No. 153,768, Nov. 17, 1993, abandoned.
[51] Int. Cl.[6] ............................................. G06F 15/00
[52] U.S. Cl. ............................................. 395/336; 395/807
[58] Field of Search ........................... 395/135, 336, 395/338, 806, 807

[56] References Cited

U.S. PATENT DOCUMENTS

| | | | |
|---|---|---|---|
| 4,100,569 | 7/1978 | Vlahos | 348/587 |
| 4,968,132 | 11/1990 | Ferren | 352/89 |
| 5,111,409 | 5/1992 | Gasper et al. | 395/152 |
| 5,235,679 | 8/1993 | Yoshizawa et al. | 395/156 |
| 5,377,319 | 12/1994 | Kitahara et al. | 395/152 |
| 5,404,316 | 4/1995 | Klinger et al. | 395/161 |
| 5,434,963 | 7/1995 | Kuwamoto et al. | 395/161 |

FOREIGN PATENT DOCUMENTS 0562995  9/1993  European Pat. Off. .

OTHER PUBLICATIONS

*Inside Macintosh: QuickTime*, Apple Computer, Inc., Jan. 1993, pp. 1–1 to 2–31.
*CD-Rom Professional*, vol. 6, No. 3, May 1993, pp. 26–32, "Lotus 1-2-3 for Windows with Multimedia SmartHelp."

*Primary Examiner*—Heather R. Herndon
*Assistant Examiner*—Joseph R. Burwell
*Attorney, Agent, or Firm*—Davidson & Gribbell

[57] ABSTRACT

A method and apparatus is provided for displaying upon a monitor having a graphical user interface a movie-type window having a Digital Help Agent that has the appearance of moving between one window and a second window. The Digital Help Agent not only can move between apparent windows, but can point items out upon the display such as buttons or menu choices by moving to and touching those buttons or menu choices. The Digital Help Agent can be provided with a three-dimensional effect to enhance the visual reality to more focus the computer user's attention upon the Digital Help Agent. The Digital Help Agent is also provided with a voice via the audio output on the computer's speaker, so that the Digital Help Agent can audibly inform the computer's user as to the effect of choosing a particular menu item or button while the Digital Help Agent is actually touching that button or menu item.

20 Claims, 6 Drawing Sheets

METHOD AND APPARATUS FOR
DISPLAYING ANIMATED CHARACTERS
UPON A COMPUTER SCREEN IN WHICH A
COMPOSITE VIDEO DISPLAY IS MERGED
INTO A STATIC BACKGROUND SUCH THAT
THE BORDER BETWEEN THE
BACKGROUND AND THE VIDEO IS
INDISCERNIBLE

This is a continuation of application Ser. No. 08/153,768, filed Nov. 17, 1993, now abandoned.

TECHNICAL FIELD

The present invention relates generally to personal computer equipment and is particularly directed to computers having graphical user interfaces of the type commonly known as the Apple MACINTOSH™ or MicroSoft WINDOWS™. The invention is specifically disclosed as a method for displaying an animated person or other character upon a computer monitor's screen in a manner that appears to be three-dimensional while moving between various portions of the screen.

BACKGROUND OF THE INVENTION

Computer systems having graphical user interfaces have been available for several years, and have become quite popular because of their ease of use. One popular type of graphical user interface is known by the name MicroSoft WINDOWS™ which operates on IBM PC's (personal computers), or other compatible types of personal computers. Another graphical user interface is known by the name Apple MACINTOSH™, which was the first graphical user interface that was commonly available for personal computer users.

Both the Apple MACINTOSH™ and the MicroSoft WINDOWS™ are capable of displaying relatively small graphic symbols, known as "icons", which when displayed on a computer monitor, each represent a particular computer program or feature of a computer program. A "mouse" or other type of pointing device (e.g., cursor control keys) is typically used to place the cursor over the particular icon desired, then a key or a button is clicked or depressed to begin execution of that particular computer program or feature. Once execution begins, a "window" appears upon the computer's monitor, which typically appears to be a rectangular or square area of the monitor's display that is bounded by a border, and may be of a different background color to more readily delineate that portion of the display. In addition, for certain application computer programs, the particular window may contain a title bar, scroll bars (horizontal and/or vertical), and boxes such as a "Zoom" box or a "Close" box (i.e., a Zoom box allowing a selected area of the display to be magnified, and a Close box enabling this particular window to be closed or "minimized" back to its icon form).

Any particular window can require the entire monitor display area, or can be of a smaller size so that more than one window can appear on the monitor at any particular time. More than one window can be operating or "open" at a given time, however, it can be arranged so that only one open window is displayed on the monitor, and other open windows are merely available but not being displayed (i.e., they are "behind" the first visible window). In the example of a word processor computer program, the visible window would be the document that is presently being edited or created, and other invisible open windows would represent other documents that can be easily accessed by the computer's user by mere commands of the mouse or keyboard, however, which are not visible until called for by the computer's user. On the other hand, the word processor computer program may allow portions of more than one window to be visible at one time on the monitor, and text from one document (in the first window) could be edited and perhaps copied into a second open and visible window, thereby being placed within the text of a second document. In such a circumstance, at least two windows would be displayed on the monitor at a particular moment, and each window would have its own border, title bar, scroll bars, and close box.

The more powerful personal computers presently available are capable of being used with a high-memory capacity optical disk storage device known as a "CD-ROM". Such CD-ROM's can contain a great amount of memory capacity and can even represent information in the form of an encyclopedia. A computer program that would be displaying the information from such a CD-ROM encyclopedia would typically have a window or two to display the text of a particular subject that is called up by the computer's user from the encyclopedia's data memory. In addition, many such CD-ROM displaying computer programs have the capability of showing a brief movie that is stored on the CD-ROM as part of its encyclopedic data. For example, a feature of the Apple MACINTOSH™ known as "QUICK-TIME" can be used to display a movie upon the computer monitor. Using QUICK-TIME™, a new window is opened upon the monitor screen so that the computer's user is made aware that a movie is about to be displayed at that portion of the screen.

The most common way of making the computer user aware of which portion of the monitor's screen to expect a movie is to display a blank area of a different background color having a border, so that the computer's user can easily discern that this portion of the screen is being prepared for the new movie data about to be provided to the monitor. As the movie is being displayed, QUICK-TIME™ allows manipulation of that movie by the use of small "buttons" that are located near this movie window. These buttons allow such features as Fast-Forward, Reverse, Pause, and Stop or Close. Since the movie being shown is in digital format, all of these features are readily available to the computer's user, and can be used much as a person controlling a video cassette recorder in playback mode. Once the movie is finished, the application computer program can either automatically close that window, or it can be manually closed under the computer user's control.

As related above, QUICK-TIME™ is a feature of an Apple MACINTOSH™ graphical user interface. A similar movie-type feature is available with MicroSoft WINDOWS™, and is known as "VIDEO FOR WINDOWS™".

Many of the computer programs presently available for windows-type computers (e.g., Apple MACINTOSH™ and MicroSoft WINDOWS™) use a feature known as "Help", which is a form of assistance given to the computer's user while the computer program is actually being executed. The Help feature is typically used by a computer's user in lieu of reading about a particular feature of the computer program in a software manual. Usually, the Help feature will help the computer user to learn how to use the different features of a computer program, and how to navigate from one feature to another.

In some instances, a Help feature will use a movie-type window such as Apple's QUICK-TIME™ to show a person or other animated character talking about various features of the computer program that are available to the user at that particular portion of the computer program. In this instance, QUICK-TIME™ can show a person or animated figure within the movie window as well as output audio information to the speaker in the computer so that the person's words can be heard by the computer's user. The person or character within the window can even point to certain portions of the monitor, such as different various buttons that may be visible at that time around the edges of the displayed screen. The person or character within the movie window, however, is limited to the confines of that window and cannot actually move around on the rest of the display to more precisely point out the different buttons that can be used by the computer's user. In addition, if more than one window is presently open, the movie actor or character cannot move from one window to the next to more readily emphasize certain features of the computer program.

SUMMARY OF THE INVENTION

Accordingly, it is a primary object of the present invention to provide a Digital Help Agent that appears to move between more than one window of a monitor having a graphical user interface in a computer system.

It is another object of the present invention to provide a Digital Help Agent that can move and touch various buttons being displayed on a computer or monitor that has a graphical user interface.

It is a further object of the present invention to provide a Digital Help Agent that has the appearance of a person or animated character walking or moving about a computer monitor's display, as well as talking and having the person's voice heard over the computer's speaker system.

It is a still further object of the present invention to provide a Digital Help Agent that has a three-dimensional appearance which moves both behind and in front of objects such as walls or tables, and which provides the effect of appearing or disappearing from one window to another on the computer's display.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved computer system is provided having a monitor with a graphical user interface in which a movie-type window displays a Digital Help Agent that has the appearance of moving between one window and a second window. The Digital Help Agent not only can move between apparent windows, but can point items out upon the display such as buttons or menu choices by moving to and touching those buttons or menu choices. In addition, the Digital Help Agent can be provided with a three-dimensional effect to enhance the visual reality to more focus the computer user's attention upon the Digital Help Agent. The Digital Help Agent is also provided with a voice via the audio output on the computer's speaker, so that the Digital Help Agent can audibly inform the computer's user as to the effect of choosing a particular menu item or button while the Digital Help Agent is actually touching that button or menu item.

The Digital Help Agent is the moving portion of a composite digitized video data file that includes a background static image that matches up with the remaining portion of the overall background display, thereby giving the appearance of a Digital Help Agent literally moving around upon the larger overall background image of the display. This is accomplished by making the composite video window have a "seamless" integration into the overall larger background display. In addition, the Digital Help Agent can appear to move behind a wall or table which is formed by portions of the overall background display's image on the screen. This enhances the three-dimensional effect of the Digital Help Agent and its movements around the display.

The composite video data file is created by choosing the portion of the background static display that is to have a Digital Help Agent moving around its area on the monitor's screen, and combining it with an actual movie of the Digital Help Agent. The creation of the Digital Help Agent's movie must be coordinated with the planned portion of the background display that is to be used, so that any border-type areas on the background display can be given the appearance of a solid wall or table that the Digital Help Agent can either go behind or in front of, thereby enhancing a three-dimensional effect. Once the movie has been created, it is merged into the portion of the background static display thereby creating the composite video data file. The composite video data file is then merged back into the overall background static display, providing a seamless integration into the larger background display, while maintaining the three-dimensional effect of the Digital Help Agent as it appears to move across or upon the larger background display.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
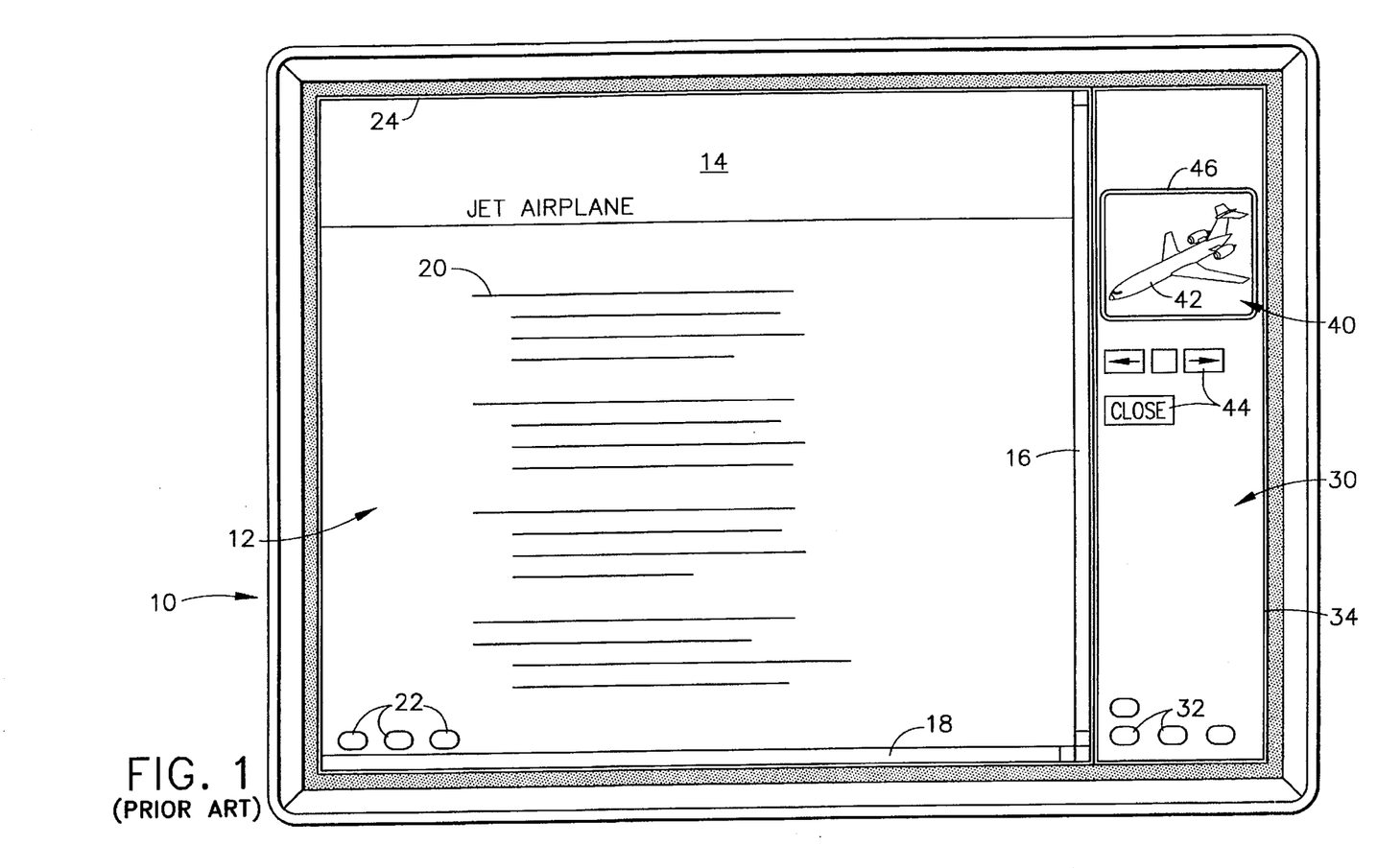
FIG. 1 is a front elevational view of a computer monitor depicting a graphical user interface-type display having an open text window and an open movie window, as known in the prior art.

Referring now to the drawings, FIG. 1 shows a monitor screen known in the prior art, generally designated by the index numeral 10, which displays text and pictorial information under the control of its graphical user interface. Such a graphical user interface could be provided by an Apple MACINTOSH™ system or a MicroSoft WINDOWS™ system. The display on monitor screen 10 includes a text window 12 and a navigation window 30. In addition, the display on monitor 10 includes a movie window 40 which is commonly available on CD-ROM systems used for displaying information such as found in an encyclopedia database.

Text window 12 includes a title bar 14, a vertical scroll bar 16, a horizontal scroll bar 18, textual information 20, control buttons 22, and a border 24. The use of the controls such as the scroll bars and the control buttons is well known in the art.

Navigation window 30 includes control buttons 32 and a border 34. The movie window 40 is displayed within navigation window 30, and includes a digital "video" image 42, control buttons 44, and a border 46. As related hereinabove, the digital video image 42 typically is a short video program that has been digitized and placed into CD-ROM. The Apple MACINTOSH™ system has a program called "QUICK-TIME™" that can display such a video CD-ROM image, and MicroSoft WINDOWS™ has a similar product called "Video for WINDOWS™".

Movie window 40 is confined to a certain area within navigation window 30, and the digital video image 42 must remain within the borders 46 of movie window 40. The control buttons 44 allow for a VCR-type control of the movie as it is played, providing features such as Reverse, Fast-Forward and Pause.

Figure 2:
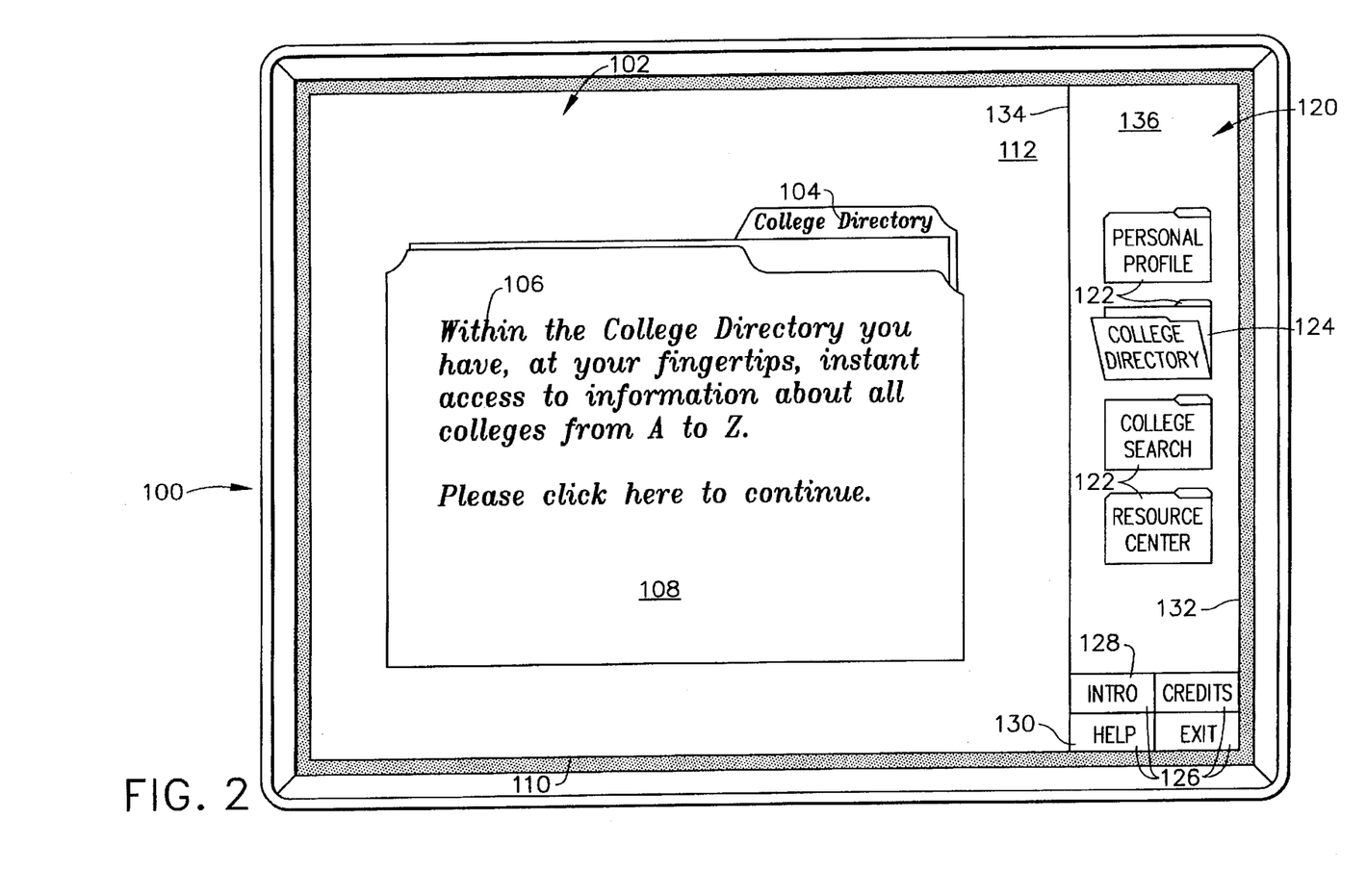
FIG. 2 is a front elevational view of a computer monitor depicting a graphical user interface-type display designed according to the principles of the present invention, showing an open text window and an open navigation window, with both windows including control buttons.

FIG. 2 shows a monitor screen of the present invention, generally designated by the index numeral 100. Monitor screen 100 includes a text window 102 and a navigation window 120. The main portion of text window 102 comprises a large control button 108, which includes a text title 104 (this is not a title bar), and text information 106. For example, if the cursor is moved anywhere within the control button 108 and then clicked (as in the use of a mouse), then the associated computer program will execute a further function with regard to that particular control button. In the illustrated example of FIG. 2, another level of information would appear on monitor screen 100 relating to the "College Directory" feature. Text window 102 has a "border" 110, however, this "border" is not a typical windows-type border, but merely is a line delineating the outer edge of text window 102.

Navigation window 120 includes four control buttons 122 in the illustrated embodiment of FIG. 2 which are used to call up particular "folders" within the associated computer program that lead to other functions and features. On FIG. 2, the presently "open" function button is given the index numeral 124, which corresponds to the "College Directory" function that is presently displayed within text window 102. Navigation window 120 also includes four other control buttons 126 that are used for assistance or to leave this particular function. Two of the important control buttons in this group are the "Introduction" button, designated by the index numeral 128, and the "Help" button, designated by the index numeral 130. It will be understood that the above-related functions and displayed features are merely examples of the capabilities of the present invention, and can be rearranged, expanded in form or numbers, and combined with other simultaneously open windows without departing from the principles of the present invention.

Navigation window 120 has a "border" 132, which merely delineates the outer edge of navigation window 120. Text window 102 and navigation window 120 join along a line which represents a "joint border", designated by the index numeral 134, and which merely separates the background area between text window 102 and navigation window 120. The "empty" background area of text window 102, designated by index numeral 112, can be a computer-generated image, and can be coordinated with the "empty" background area of navigation window 120, designated by index numeral 136. Area 136 can also be a computer-generated image, and can be similar in appearance to area 112, perhaps varying only in shade of a single color, or in texture of the same color. The choice as to how areas 112 and 136 are coordinated with one another is strictly up to the system designer, and the contrast level between these areas can be very low or very high, depending upon the effect desired.

Figure 3:
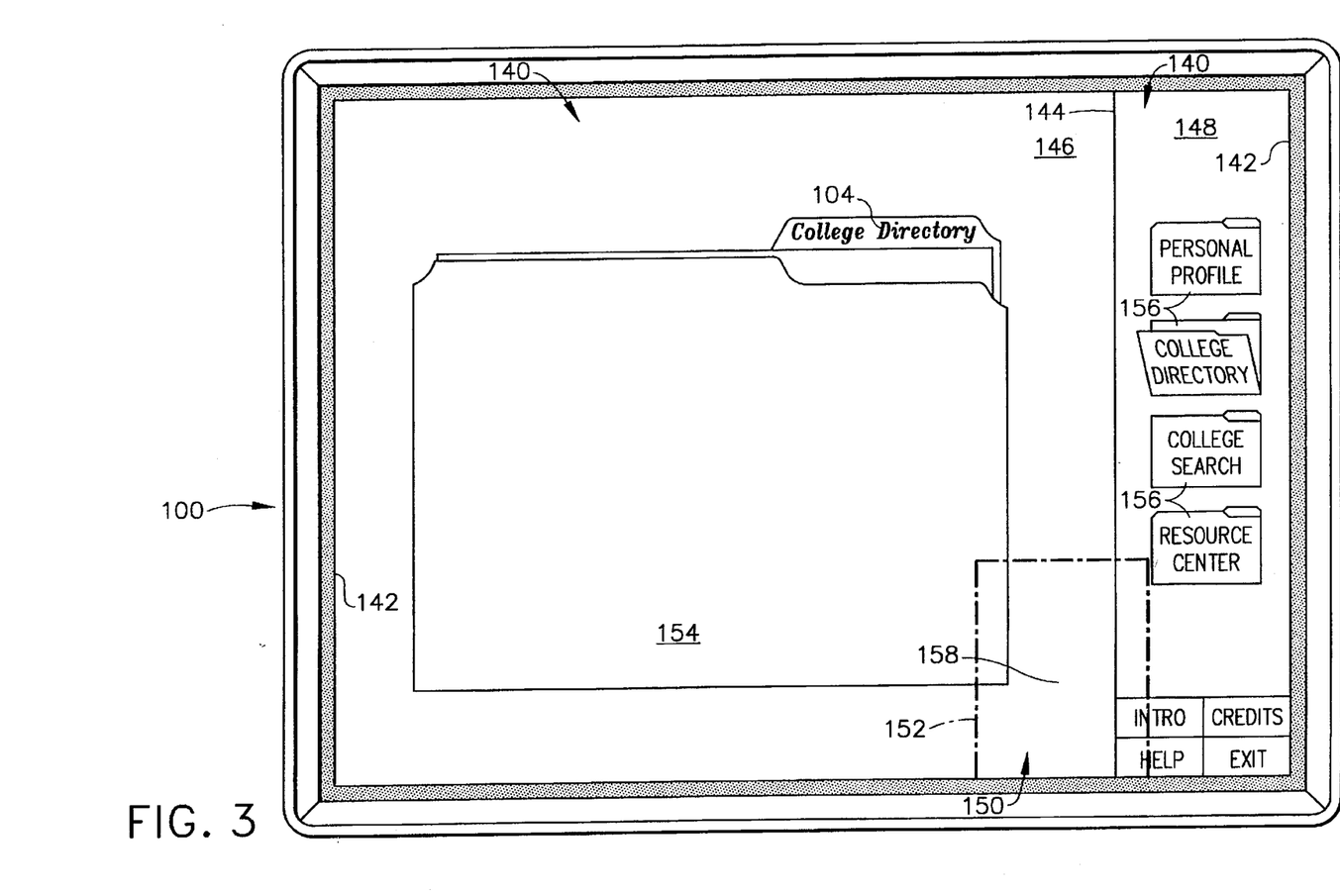
FIG. 3 is a front elevational view of the computer monitor display of FIG. 2, however, the previously opened windows have become a static background window, and a new composite window having a seamless appearance has been introduced onto the display.

FIG. 3 depicts the monitor screen 100 after the "Introduction" button 128 has been selected (i.e., once the mouse has been clicked on the Introduction button 128 while displaying the monitor screen 100 of FIG. 2). Once the Introduction button 128 has been selected, text window 102 and navigation window 120 are both temporarily closed insofar as they are no longer "active" windows (i.e., their buttons are no longer functional). However, the images of text window 102 and navigation window 120 continue to remain displayed upon monitor screen 100, as a single fixed background window, designated by the index numeral 140. Background window 140 has a "border" 142, which merely defines the outer edge of background window 140. The previous "joint border" 134 now becomes a non-border 144, and merely delineates a line between two of the "empty" areas, designated by the index numerals 146 and 148, of background window 140. Since background window 140 is fixed, and the buttons are no longer operable, control button 154 for the text window is now non-operable, and the navigation window control buttons 156 are also non-operable.

A new composite window 150 is now opened within the confines of background window 140. Composite window 150 is designed to contain both fixed background information and moving video information in the form of a digitized movie. An invisible "border" 152 forms the outer edges of composite window 150, and is shown on FIG. 3 as a phantom line. Border 152 is invisible, because composite window 150 has the same "empty" background area 158 that previously existed as part of background window 140. Such an invisible border 152 is truly "seamless", because there is no visual difference between the previous empty area of background window 140 and the new "empty" area 158 of composite window 150.

Since composite window 150 is designed to display a movie while maintaining the same background appearance as background window 140, the computer's user will see no change in the appearance of monitor screen 100 until that movie actually begins. Once the movie begins, it can show moving objects or persons anywhere within the confines of composite window 150.

Figure 4:
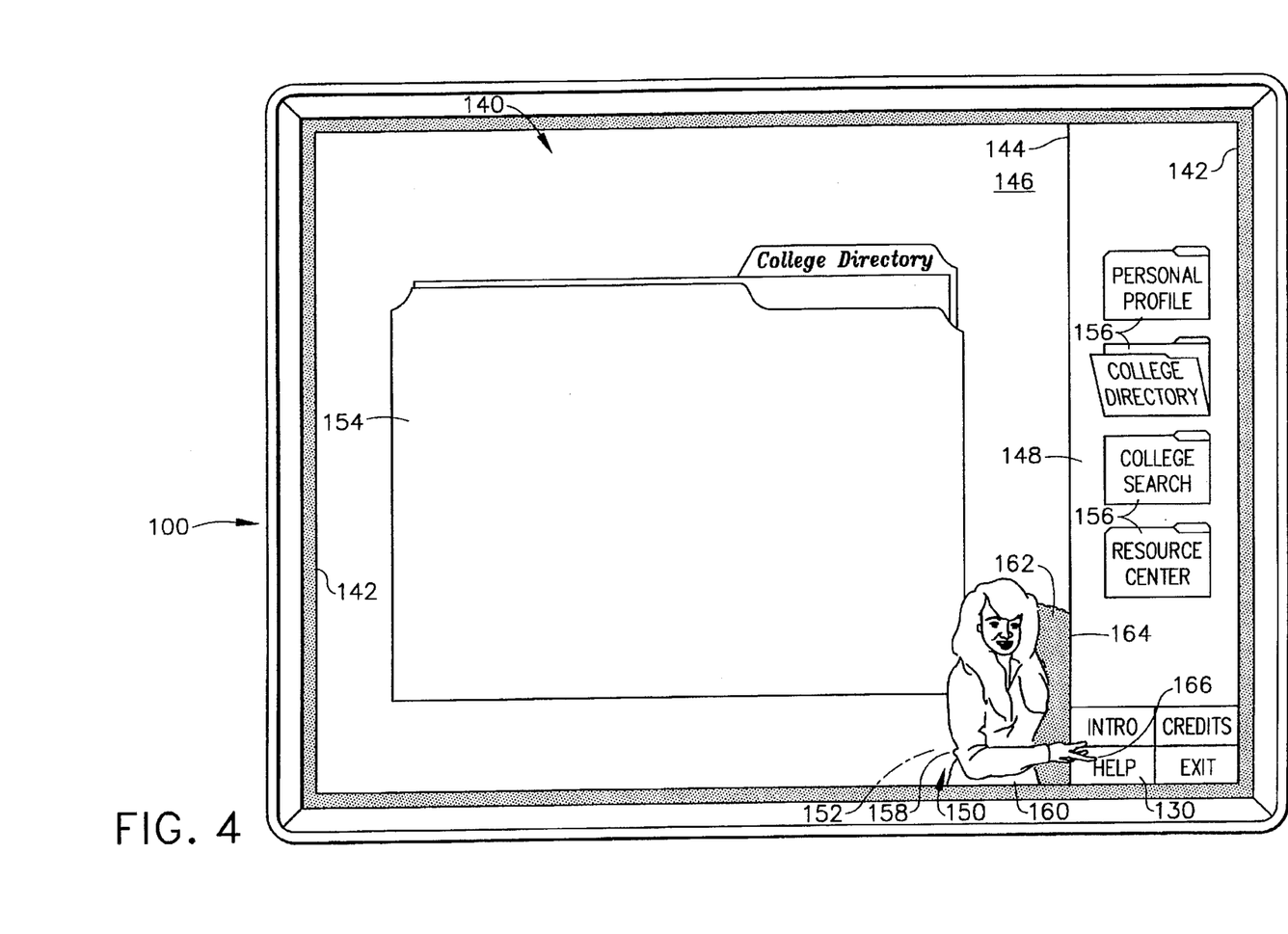
FIG. 4 is a front elevational view of the computer monitor display of FIG. 3 in which a Digital Help Agent is included within the composite window.

FIG. 4 shows a Digital Help Agent, designated by the index numeral 160, displayed within the confines of composite window 150. As can be seen in FIG. 4, the invisible border 152 of composite window 150 cannot be discerned by the computer's user while viewing monitor screen 100. In the illustrated embodiment of FIG. 4, Digital Help Agent 160 is represented by an image of a human being, and has a three-dimensional appearance.

Digital Help Agent 160 casts a shadow 162 upon the background empty area 158 of composite window 150. Since "empty" area 158 of composite window 150 is indistinguishable from the graphic design of the previous background window 140, Digital Help Agent 160 and its shadow 162 appear to be moving directly upon or across the background window 140. Since there is no visible border of composite window 150, the three-dimensional effect has a greater impact upon the computer's user while viewing monitor screen 100. As can be seen in FIG. 4, shadow 162 is cut-off by a border line designated by the index numeral 164. For an enhanced visual effect, border line 164 directly corresponds to (i.e., it lines up with) the "non-border" 144 between empty areas 146 and 148 of background window 140. In this arrangement, Digital Help Agent 160 can disappear behind empty area 148 to the right of border line 164. At the same time, Digital Help Agent 160 can appear in front of empty area 146 (to the left of border line 164).

Once Digital Help Agent 160 is on the screen within composite window 150, not only can it appear in front of empty area 146 to the left of border line 164, but it can additionally move in front of empty area 148 to the right of border line 164. In the illustrated embodiment of FIG. 4, the hand of Digital Help Agent 160 is touching the "Help" button 130 at the location indicated by index numeral 166. Although "Help" button 130 is presently non-operable, the hand of Digital Help Agent 160 is effectively showing the computer's user exactly where to move the cursor to obtain Help, and the movie being played within composite window 150 preferably uses the computer's audio output so that the Digital Help Agent 160 can talk to the computer's user through the computer's speaker.

Of course, Digital Help Agent 160 could also touch other control buttons, such as the "Introduction" button 128 which also is non-operable while the Digital Help Agent 160 is explaining how it is to be used. In addition, Digital Help Agent 160 could also turn to the left (as viewed on monitor screen 100) and touch the non-operable control button 154 in the text window. It will be understood that any control button or other feature of composite window 150 could be touched or pointed to directly by Digital Help Agent 160, as desired to achieve a particular visual effect upon the computer's user. By use of the concepts of the present invention, Digital Help Agent 160 literally appears to be interactive with background window 140, thereby providing an enhanced visual effect for assisting the computer's user in a manner that was heretofore not achievable.

Figure 5:
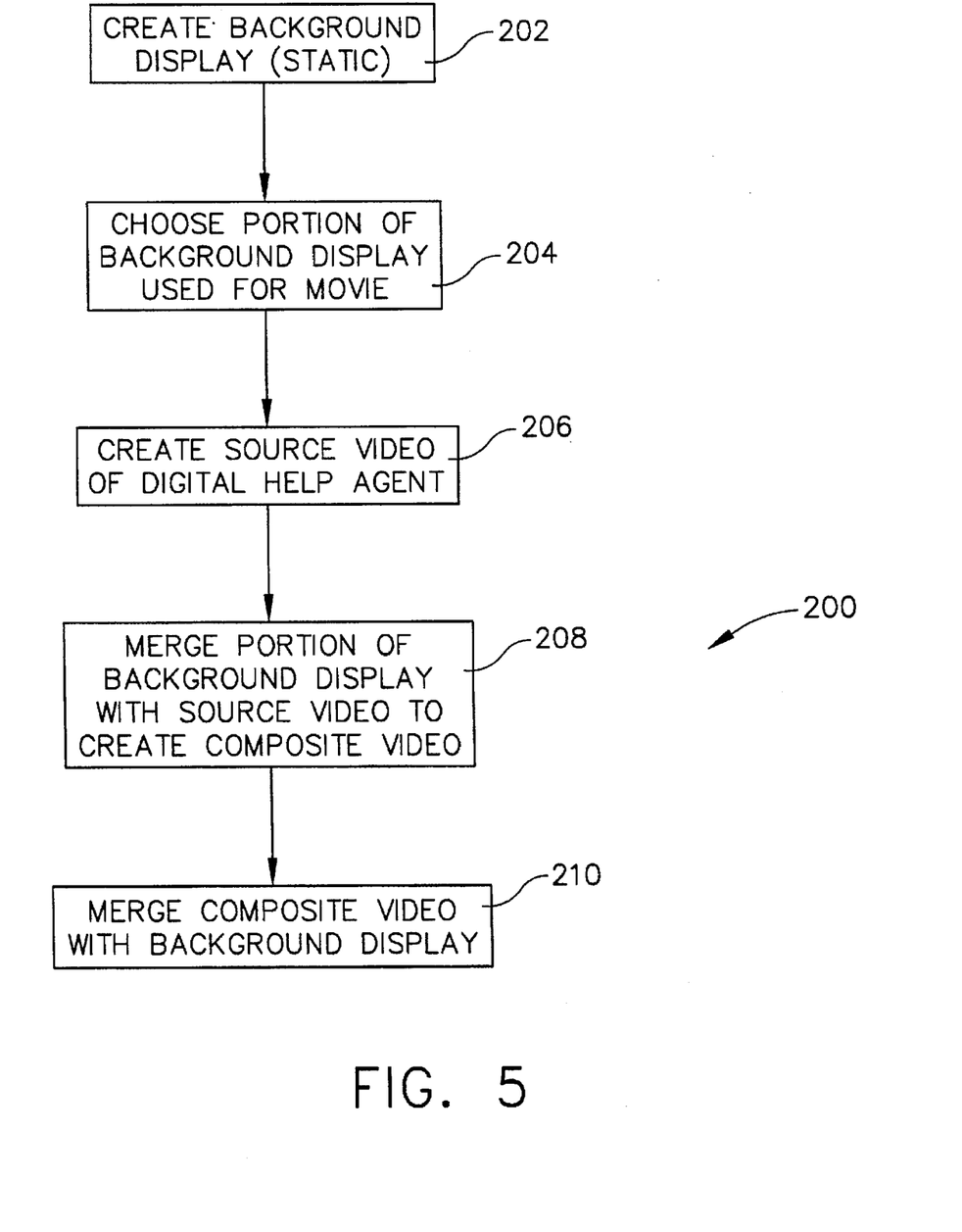
FIG. 5 is a flow chart depicting a method of creating a composite video that is used in conjunction with a background display to provide a "seamless" overall effect while displaying a Digital Help Agent.

A method of creating composite window 150, including a movie, is provided in FIG. 5 by a flow chart 200. The first step in this method is to create a background display such as the fixed background 140 (of FIG. 3), according to function block 202. It is preferred that an Apple MACINTOSH™ graphical user interface environment, known as MAC-OS™, be used to perform function block 202. MAC-OS™ is available from Apple Computer, Inc., located in Cupertino, Calif. The actual creation of background window 140 can be easily accomplished using a software tool known as ADOBE PHOTOSHOP™, available from Adobe Systems, located in Mountain View, Calif. By the use of ADOBE PHOTOSHOP™, photographic images can be scanned into a computer and digitized, texture and color changes can be added to such scanned images, computer-created graphical images and text information can be added, and many types of photographic manipulation can be achieved. In effect, the types and variety of digitized images available for inclusion in background window 140 is virtually endless when using ADOBE PHOTOSHOP™, including the appearance of "buttons" that become selectable regions of the display that each initiate a function when clicked upon by a mouse or cursor control keys.

The data file created by ADOBE PHOTOSHOP™ can be output into a prototyping software tool known as the MACROMEDIA DIRECTOR™, which is manufactured by MacroMedia Corporation, located in San Francisco, Calif. MACROMEDIA DIRECTOR™ is strictly a prototyping software tool, and is not required for use in creating background window 140. However, it is preferred that some type of prototyping software tool be used for this process step.

Once background window 140 is available, the next step of flow chart 200 is function block 204, in which a portion of background window 140 is chosen for use with the movie to be created. Such portion could include a "border" line or "seam" line that separates two regions, which will enhance the effect of movements by the Digital Help Agent 160 as it moves behind or in front of certain areas near the border or seam line. This portion of the display could also include areas on background display 140 that have some buttons, such as a "Help" button or an "Introduction" button. This portion of background window 140 will ultimately be "clipped" out from background window 140 during the process of merging this portion with the movie, described in greater detail below.

The next step of flow chart 200 is to create the source video of Digital Help Agent 160, according to function block 206. This source video is typically stored upon a video tape at thirty (30) frames per second, and consists of the Digital Help Agent 160 going through its paces, such as an actor or actress working with a blue screen (to provide a Chromakey effect). The source video can be digitized and stored in a computer, rather than on a video tape in a video format. It is preferred that the video information be instantly digitized and stored using a computer program called ADOBE PREMIER™ to capture the video data onto a plug-in hardware card having the model name DIGITAL FILM™, manufactured by SuperMac, located in Sunnyvale, Calif.

As the source video is produced, the director must keep in mind how the Digital Help Agent is to appear upon background window 140. This is especially important if the Digital Help Agent is to achieve any three-dimensional effects, such as walking out from behind or in front of a wall, or standing or sitting behind a table. A script is typically used to preordain the actions and words of the Digital Help Agent, and this is called a "story board". The wall or table from which the Digital Help Agent is to appear behind (or in front of) would typically line up with a seam line described above, and these borders must be aligned so that the desired effect is achieved. The blue screen is used while making the source video so that the blue background will be essentially invisible (using the Chromakey effect) when the source video is merged with the portion of background window 140 that is to be used to make composite window 150.

A composite video data file is created in function block 208 by merging the portion of background window 140 with the source video created in function block 206. As related above, the chosen portion of background window 140 is clipped out from that window, having the exact size of the final video composite window 150. It is preferred that a software tool be used to perform this step, one of which is MACROMEDIA SCREENCLIP™, manufactured by MacroMedia Corporation of San Francisco, Calif., and another software product of which is named EXPOSURE PRO™, manufactured by Baseline Publishing Inc., located in Memphis, Tenn. The source video created in function block 206 is now merged into this portion of background window 140, using a software tool, preferably a computer program called AFTER EFFECTS™, manufactured by the Company of Science and Art (COSA), located in Providence, R.I.

It is important, during the merger step, that the overlay video information lines up its "blue" video edges with any seam or border lines that are perceived in background window 140. Once the merger has occurred, a new composite video is available that essentially is a movie having a fixed background. This composite video is a file that can be played by the QUICK-TIME™ computer program available on the Apple MACINTOSH™ system.

It will be understood that effect of a movie having a "busy" background can be achieved, regardless of the fact that Apple Computer, Inc. itself recommends that QUICK-TIME™ documents be made without any background at all, to achieve optimum playback. The lack of any background provides better synchronizing between the voice and the video for a talking movie, since the computer system can more easily "keep up" in real time, by executing of all its functions more quickly than for a movie having a background. This composite video data file can be stored upon a hard disk of a computer system for playback by Apple's QUICK-TIME™. However, if the composite video is to be stored upon a CD-ROM, the format must be somewhat changed because the hard disk version of the composite video would be a high quality video representation, running at twenty-four (24) frames per second. A CD-ROM representation would execute at a slower number of frames per second, typically in the range of twelve (12) to fifteen (15) frames per second.

Since the CD-ROM can play back at a data rate of 90 kbits per second, the smaller the overall image of the composite video, the higher the number of frames per second that can be played back. For use in the present invention, the composite video is preferably run through a computer program known as MOVIE SHOP™, which is manufactured by Apple Computer Inc. MOVIE SHOP™ provides a data file that can be stored on CD-ROM and played back in a CD-ROM format. Since there are fewer frames per second (as compared to a hard disk version of the video information), the CD-ROM image will be somewhat more grainy (having less resolution), and will lose a certain amount of fluidity of movement (of the Digital Help Agent).

The difficult part of merging the source video with the portion of the background window is making the composite video "seamless" with respect to the overall background window 140, and to line up the blue screen structures (e.g., a wall, or a table) with the appropriate "seam line" from the clipped-out background portion of background window 140. Once everything is aligned, the Digital Help Agent 160 will truly appear to walk and move amongst the fixed background window 140 without any appearance of a border or any other type of lines surrounding the Digital Help Agent. This produces a very striking visual effect for the computer's user.

The last step of flow chart 200 is merging the composite video into the background window 140, as per function block 210. As related above, the difficult part of this method step is to have the background portion of the composite video appear to be "seamless" with respect to the overall background window 140. To achieve this effect, the pixels of the fixed background window 140 must precisely line up with the pixels of composite window 150, thereby achieving a background which does not appear to be disturbed at all by the introduction of the composite video. After this merger occurs, the composite video data file that is used for display in composite window 150 can be played by Apple's QUICK-TIME™ computer program. In addition, while this merger process is being accomplished, the MACROMEDIA DIRECTOR™ software tool can be used to test the final effect.

Figure 6:
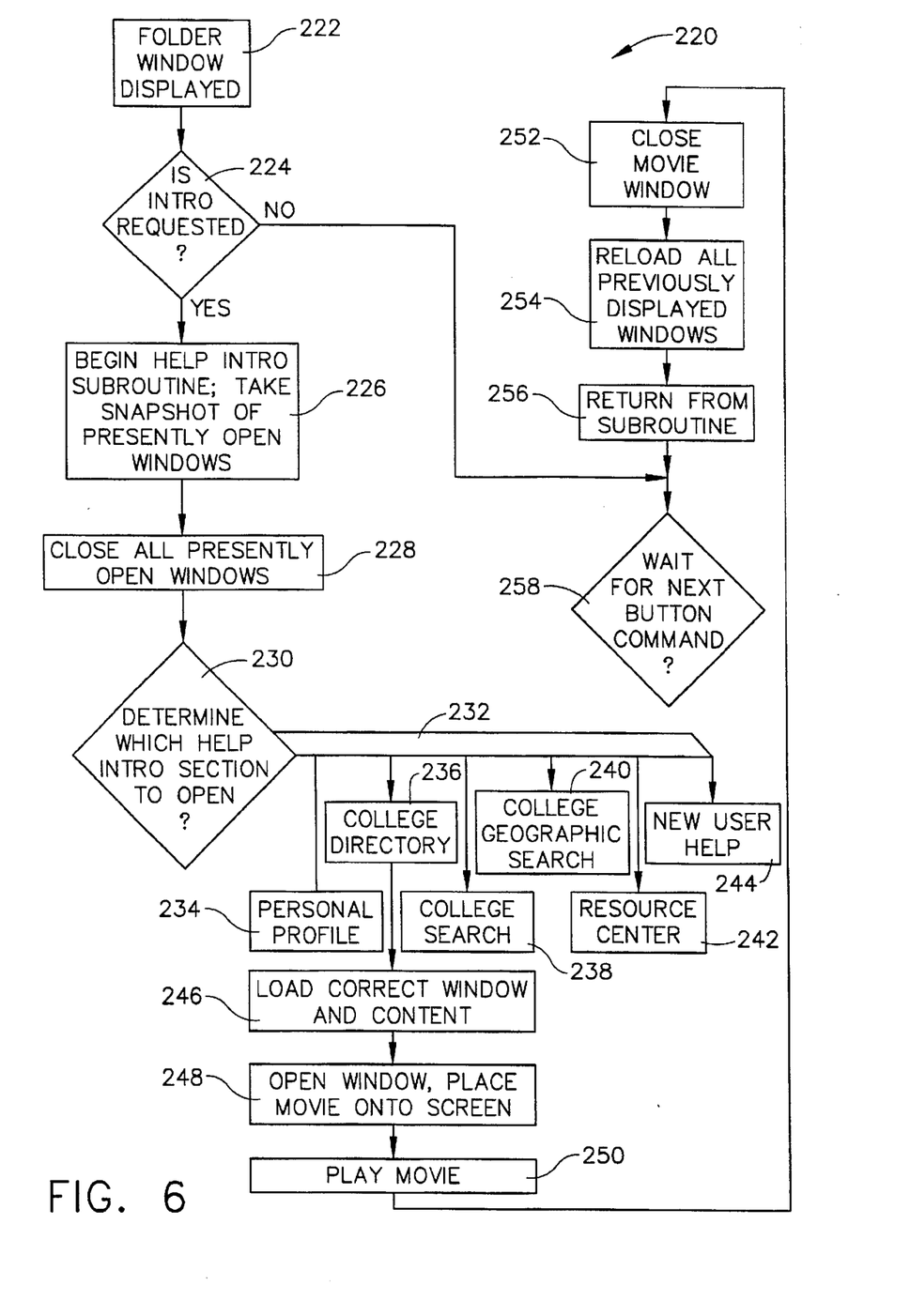
FIG. 6 is a flow chart of the steps required to use a composite window as part of an overall background window on a computer monitor's display in a graphical user interface environment, in which a Digital Help Agent appears upon the background display as a moving person or animated character, and wherein the composite window is seamless with respect to the background display.

FIG. 6 shows a flow chart 220 that explains the procedure for using composite window 150 with background window 140. When used on a preferred MACINTOSH™ monitor 100, background window 140 includes a resolution of 640 pixels horizontal by 480 pixels vertical (640×480). As seen in FIG. 2, text window 102 preferably has a pixel count of 517×480, and navigation window 120 preferably has a pixel count of 123×480. As related above, the larger the composite window in size (i.e., in pixel count), the more powerful the computer and memory system that is required to update the movie portion of composite window 150. Using a standard 650 megabyte CD-ROM drive, it is preferred that composite window 150 have a pixel count of 160×120. Of course, if more than one composite window is to be simultaneously opened and its corresponding movie played, then each such window could have this 160×120 pixel size, or other sizes, as per the system designer's wishes.

Flow chart 220 begins with function block 222, in which a particular folder window has been requested to be displayed on monitor 100 (e.g., as seen in FIG. 2). Once the folder window is displayed on monitor 100, the computer system (not shown) awaits a command from the computer's user, in the form of clicking on one of the control buttons by a mouse or cursor control. At decision block 224, it is determined whether or not the "Intro" (Introduction) control button 128 is selected or not. If the answer is YES, then the control flow leads to function block 226, which is the beginning of the Help Introduction subroutine. Under the control of function block 226, a "snapshot" is taken of all the presently open windows—in this case text window 102 and navigation window 120. This entails storing the exact windows that are presently open and being displayed on monitor 100 (i.e., presently stored in video RAM [Random Access Memory] and having corresponding files in system memory RAM) so that the computer can later recall which windows had been opened before execution of function block 226. After this has occurred, all the presently opened windows are closed under control of function block 228. Once that occurs, the control buttons are no longer active and cannot be used by the computer's user.

Decision block 230 now determines which Help Introduction section is to be opened next. In the illustrated embodiment of FIG. 2, the College Directory introductory section would be called upon, via function block 236. However, in the computer system of the illustrated embodiment, other similar Help Introduction sections are available, such as a "Personal Profile" via function block 234, "College Search" via function block 238, "College Geographic Search" via function block 240, "Resource Center" via function block 242, and "New User Help" via function block 244. Any one of these function blocks could be commanded to be executed, as determined by decision block 230, following the flow path along a decision highway 232.

In the illustrated embodiment of FIG. 2, the "College Directory" Help Introduction section is opened (i.e., its dam files are "opened" and placed into system memory RAM) under the control of function block 236, and the flow path is followed to function block 246, at which time the correct window is loaded along with its contents into video RAM. Function block 246 determines the correct static background display which is to serve as the background for the composite window that will be opened shortly. In the illustrated embodiment of FIG. 3, this background display is background window 140, and has a size of 640 by 480 pixels (i.e., the entire monitor display viewing area). It will be understood that the background display need not take up the entire monitor screen 100, and in fact, there could be more than one active background display and composite window being displayed simultaneously on monitor screen 100. In the circumstance where there is more than one static background display, function block 246 must determine which background display is to be placed upon monitor screen 100 and at exactly what location upon monitor screen 100 (i.e., its starting horizontal and vertical pixel values).

Once function block 246 determines the static display or displays to be placed upon monitor screen 100, it must then determine the location upon, and which background static display that the movie screen is to be placed. This information is important for alignment with the static display and the movie's background. In addition, function block 246 must determine exactly which movie is to be played, including its animated portion and its background which is to be aligned with the static display. It will be understood that the information that is temporarily stored in system memory RAM is not directly placed into video RAM, but is first transformed into the proper digital pixel format by a video adaptor module (not shown), which is a standard hardware module of the computer system.

After the correct window and contents are loaded into the video RAM, via function block 246, the composite window and movie are placed onto monitor screen 100 under the control of function block 248. An example of this is given in FIG. 3, in which case the first window to be opened is the background window 140, and the second window to be opened is the composite window 150, as placed in the location near the lower right-hand corner. As seen in FIG. 3, there is no animation or movie character, such as the Digital Help Agent 160, as of yet displayed on monitor screen 100.

After the composite window 150 is opened and the movie is placed onto the screen (i.e., into video RAM) under the control of function block 248, the movie is then played under the control of function block 250. An example of this is FIG. 4, in which the Digital Help Agent 160 is placed upon monitor screen 100, then apparently moves across areas of background window 140, while in fact, it is moving within composite window 150. As related hereinabove, Digital Help Agent 160 can appear either in front of or behind various portions of background window 140, including its empty areas 146 and 148.

Once the movie has completed playing, the movie window (composite window 150) is closed (i.e., the video RAM's contents are cleared) under the control of function block 252. After that has occurred, all of the previously displayed windows are reloaded into video RAM under the control of function block 254. This essentially places the same displays onto monitor screen 100 that were visible before the beginning of the Help Introduction subroutine at function block 226. After the previously displayed windows have been reloaded, the control flow arrives at function block 256 which returns from this subroutine. Once the subroutine has ended, the control flow arrives at decision block 258 waiting for the next control button command to take place. The control flow can be directed back to the initial function block 222 of flow chart 220, or it can be directed to an entirely different function not described herewith.

It will be understood that two or more movies could be playing simultaneously on monitor screen 100. Each movie would be under the control of its own subroutine, via a control flow such as flow chart 220. Each movie could include a separate Digital Help Agent which could take rams talking, through the computer's speaker, with other Digital Help Agents in other movies.

As related above, the preferred computer system for use with the present invention is an Apple MACINTOSH™ computer. The precise specifications for the preferred computer system are as follows: A MACINTOSH CENTRIS 610™, having a microprocessor, part number MC68040, running at 20 mHz clock rate; 8 MB (megabytes) memory RAM; 1024 KB (kilobytes) of video RAM; a built-in Apple SuperDrive 1.4 MB floppy disk drive; a built-in CD-ROM drive having 650 MB capacity; a built-in 80 MB hard disk drive; an Apple Keyboard II; an Apple Desktop Bus Mouse II; and an external MODEM. The recommended MODEM is a 14/4-type, preferably a PROMETHEUS ULTIMA™, manufactured by Prometheus Corporation, located in Tualatin, Oreg.

It will be understood that full-time data, such as data that represents movies containing a Digital Help Agent, are preferably stored on CD-ROM, because of the large size of such data files. Quick-access data, such as data required to display information from a database, is preferably stored on the hard disk drive, for ease and access speed in reading such data as needed by the computer system. In addition, all executable files are preferably stored on the hard disk drive. This facilitates a quick response when "booting" or initiating execution of the overall computer system, and allows for updating or upgrading the computer programs contained in such executable files.

The preferred monitor screen 100 is a MACINTOSH™ color display, 14" diagonal, 13" viewable, and having the model name Trinitron CRT. In addition, an ink-jet printer is recommended, preferably the Apple StyleWriter II, having a 360 dpi (dots per inch) letter quality print.

It will be understood that other computer systems than Apple can be used to implement the present invention without departing from its principles. In addition, more powerful computer systems could certainly be used to implement the present invention, and in fact would make it easier to display more than one static background window and composite window simultaneously upon one particular monitor screen. The hardware of future computer systems will undoubtedly be integrated into the video monitor, thereby providing all the necessary computer power in one enclosure, complete with viewing screen.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. A method of providing visual information on a monitor of a computer system, comprising the steps of:

(a) providing a computer system having a video monitor, said computer system having a graphical user interface which displays information in both pictorial and textual form upon said video monitor, said computer system having a file memory system and a video memory system;

(b) displaying a first image upon said video monitor by loading a first set of information into said video memory system, via opening a first file within said file memory system, said first file containing data defining said first set of information;

(c) taking a snapshot of said entire first image, thereby creating a temporary second file within said file memory system containing data corresponding to said first set of information;

(d) displaying a second image upon said video monitor in a format as a background, while visually removing said first image from said video monitor, by loading a second set of information into said video memory system, via opening said temporary second file within said file memory system, said second file containing data defining said second set of information; and (e) displaying a third image upon said video monitor, said third image being smaller than said second image and creating a border therebetween, by loading a third set of information into said video memory system, via opening a third file within said file memory system, said third file containing data defining said third set of information, said third set of information duplicating a portion of said second set of information so that the visual appearance of said third image, once displayed upon said video monitor, duplicates a portion of said second image and is integrated with said second image in a seamless manner along the border between said second and third images such that the border is indiscernible, said third set of information additionally containing a movie that includes an animated digital help agent, wherein said movie is played such that said digital help agent, as part of said third image, has an appearance of being able to move anywhere upon the larger said second image, while in fact being confined to the smaller said third image, thereby creating a video special effect.

2. The method as recited in claim 1, further comprising the steps of:

(a) closing, after said movie has finished, said second and third files within said file memory system and removing said second and third images from said video monitor; and (b) displaying said first image upon said video monitor by reloading said first set of information into said video memory system.

3. The method as recited in claim 1, wherein said second image is a static image.

4. The method as recited in claim 1, wherein said first file is an active window having at least one active button, said second file is a temporary inactive window that has no active buttons, and said third file is a window which contains an active movie.

5. The method as recited in claim 4, further comprising the steps of:

(a) simultaneously, while displaying said second and third images, displaying a fourth image upon said video monitor at a different location upon said video monitor than said first image, by loading a fourth set of information into said video memory system, via opening a fourth file within said file memory system, said fourth file containing data defining said fourth set of information;

(c) taking a snapshot of said fourth image, thereby creating a temporary fifth file within said file memory system containing data corresponding to said fourth set of information;

(d) displaying a fifth image upon said video monitor in a format that acts as a background and at the same location upon said video monitor that said fourth image previously occupied, while visually removing said fourth image from said video monitor, by loading a fifth set of information into said video memory system, via opening said temporary fifth file within said file memory system, said fifth file containing data defining said fifth set of information; and (e) displaying a sixth image upon said video monitor, said sixth image being smaller than said fifth image and creating a second border therebetween, by loading a sixth set of information into said video memory system, via opening a sixth file within said file memory system, said sixth file containing data defining said sixth set of information, said sixth set of information substantially duplicating a portion of said fifth set of information so that the visual appearance of said sixth image, once displayed upon said video monitor, duplicates a portion of said fifth image and is integrated with said fifth image in a seamless manner along the second border between said fifth and sixth images such that the second border is indiscernible, said sixth set of information additionally containing a movie that includes a digital help agent, wherein said movie is played such that said digital help agent, as part of said sixth image, has an appearance of being able to move anywhere upon the larger said fifth image, while in fact being confined to the smaller said sixth image, thereby creating a video special effect.

6. The method as recited in claim 1, wherein said digital help agent has a three-dimensional appearance.

7. The method as recited in claim 6, wherein said digital help agent casts a shadow upon said second image.

8. The method as recited in claim 6, wherein said digital help agent has an appearance of moving behind and in front of portions of said second image.

9. A method of creating visual information for use on a monitor of a computer system, comprising the steps of:

(a) providing a computer system having a video monitor, said computer system having a graphical user interface which displays information in both pictorial and textual form upon said video monitor, said computer system having a file memory system and a video memory system;

(b) creating a first file within said file memory system that contains data defining a first set of information that, upon being loaded into said video memory system, displays, upon said video monitor, a first image which is a background image;

(c) selecting a portion of said first image to contain a movie and storing its corresponding image data into a second file within said file memory system, thereby defining a second set of information, and thereby creating a second image which is smaller than said first image and creating a border therebetween;

(d) creating a source video of an animated digital help agent to be used in said movie;

(e) merging said second set of information with said source video, thereby creating a composite video, said composite video comprising a third set of information which, when loaded into said video memory system, displays, upon said video monitor, a third image thereby creating said movie, said third image having the same border as said second image; and (f) merging said third set of information with said first set of information, thereby creating a fourth set of information that, upon being loaded into said video memory system, displays, upon said video monitor, a fourth image that has a seamless appearance along the border between said first and third images such that the border is indiscernible, said fourth image containing said digital help agent which has an appearance of being able to move anywhere upon the larger said first image, while in fact being confined to the smaller said fourth image, thereby creating a video special effect.

10. The method as recited in claim 9, wherein said digital help agent has a three-dimensional appearance.

11. The method as recited in claim 10, wherein said digital help agent casts a shadow upon said first image.

12. The method as recited in claim 10, wherein said digital help agent has an appearance of moving behind and in front of portions of said first image.

13. A computer system for displaying visual information on a video monitor, said computer system comprising:

(a) a computer system having a video monitor, said computer system having a graphical user interface which displays information in both pictorial and textual form upon said video monitor, said computer system having a file memory system and a video memory system;

(b) said video monitor being configured to display a first image upon said video monitor, wherein said first image is a background image; and (c) said video monitor being further configured to display a second image upon said video monitor, wherein said second image is a movie that contains an identical portion of said first background image and an animated digital help agent, said second image being smaller that said first image and creating a border therebetween, said second image being integrated into said first background image in a seamless manner along the border between said first and second images such that the border is indiscernible, and said movie being played such that said digital help agent, as part of said second image, has an appearance of being able to move anywhere upon the larger said first background image, while in fact being confined to the smaller said second image, thereby creating a video special effect.

14. The computer system as recited in claim 13, wherein said digital help agent has a three-dimensional appearance.

15. The computer system as recited in claim 14, wherein said digital help agent casts a shadow upon said first image.

16. The computer system as recited in claim 14, wherein said digital help agent has an appearance of moving behind and in front of portions of said first image.

17. A computer system for displaying visual information on a video monitor, said computer system comprising: a computer system having a video monitor, said computer system having a graphical user interface which displays information in both pictorial and textual form upon said video monitor, said computer system having a file memory system and a video memory system; wherein said video monitor displays a first background image, and said video monitor simultaneously displays a second movie image, said second movie image containing an identical portion of said first background image and an animated digital help agent, said second movie image being smaller that said first background image and creating a border therebetween, said second movie image being integrated into said first background image in a seamless manner along the border between said first and second images such that the border is indiscernible, and said movie being played such that said digital help agent, as part of said second movie image, has an appearance of being able to move anywhere upon the larger said first background image, while in fact being confined to the smaller said second movie image, thereby creating a video special effect.

18. The computer system as recited in claim 17, wherein said digital help agent has a three-dimensional appearance.

19. The computer system as recited in claim 18, wherein said digital help agent casts a shadow upon said first background image.

20. The computer system as recited in claim 18, wherein said digital help agent has an appearance of moving behind and in front of portions of said first background image.

* * * * *